US012789735B2

(12) United States Patent
Azharuddin et al.

(10) Patent No.: US 12,789,735 B2
(45) Date of Patent: Nov. 10, 2026

(54) BREAKAWAY SUPPORTING MEMBER HAVING CONTROLLED BREAK POINTS

(71) Applicant: International Truck Intellectual Property Company, LLC, Lisle, IL (US)

(72) Inventors: Syed Azharuddin, Troy, MI (US); Jason Robert Iannotti, Naperville, IL (US); Ed Kretch, Aurora, IL (US); William Enowmbitang, Lake Villa, IL (US); Connor Jeffrey Tharp Lumley, Grand Junction, CO (US); Matthew Villaverde, Aurora, IL (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 305 days.

(21) Appl. No.: 18/594,096

(22) Filed: Mar. 4, 2024

(65) Prior Publication Data

US 2025/0276659 A1 Sep. 4, 2025

(51) Int. Cl.

| | |
|---|---|
| ***B60R 19/34*** | (2006.01) |
| *B60R 19/18* | (2006.01) |
| *B60R 19/24* | (2006.01) |
| *B60R 19/26* | (2006.01) |

(52) U.S. Cl.

CPC ...... *B60R 19/34* (2013.01); *B60R 2019/1886* (2013.01); *B60R 2019/1893* (2013.01); *B60R 19/24* (2013.01); *B60R 2019/247* (2013.01); *B60R 19/26* (2013.01)

(58) Field of Classification Search

CPC .................. B60R 19/34; B60R 19/023; B60R 2019/1886; B60R 2019/1893; B60R 19/24; B60R 2019/247; B60R 19/26

USPC ....... 293/132, 133, 155; 296/187.03, 187, 9, 296/187.1, 11

See application file for complete search history.

(56) References Cited

U.S. PATENT DOCUMENTS

| | | | |
|---|---|---|---|
| 2,217,871 | A | 10/1940 | Lindgren |
| 2,431,495 | A | 11/1947 | Mosser |
| 2,518,317 | A | 8/1950 | Hilblom |
| 3,243,203 | A | 3/1966 | Hermiz et al. |
| 3,702,711 | A | 11/1972 | Beckley |
| 3,907,352 | A | 9/1975 | Spain et al. |
| 6,213,526 | B1 | 4/2001 | Swanger et al. |

(Continued)

FOREIGN PATENT DOCUMENTS

| | | |
|---|---|---|
| GB | 2560546 A | 9/2018 |

OTHER PUBLICATIONS

KR101517723B1 with English translation; Goo; Feb. 25, 2026 (Year: 2026).*

*Primary Examiner* — Roger L Pang
(74) *Attorney, Agent, or Firm* — Umang Khanna

(57) ABSTRACT

A breakaway supporting member having controlled break points includes one or more slotted members configured to attach to a vehicle chassis and a structural support member configured to support one or more vehicle components. The structural support member includes one or more discrete stress risers that extend from the structural support member, wherein each of the one or more discrete stress risers includes a tab extending therefrom. Each of the tabs is configured to be inserted through a slot disposed through each of the one or more slotted members.

16 Claims, 4 Drawing Sheets

(56) References Cited

U.S. PATENT DOCUMENTS

| | | | | |
|---|---|---|---|---|
| 6,254,161 | B1 * | 7/2001 | Wochaski | F16B 37/041 248/225.11 |
| 6,928,351 | B2 | 8/2005 | Bowman | |
| 7,086,673 | B2 | 8/2006 | Connett et al. | |
| 8,500,191 | B1 | 8/2013 | Baccouche et al. | |
| 8,622,445 | B1 | 1/2014 | Portney et al. | |
| 2006/0125253 | A1 * | 6/2006 | Trabant | B60R 19/24 293/155 |
| 2008/0265591 | A1 | 10/2008 | Tolani | |
| 2012/0292931 | A1 * | 11/2012 | Mizoguchi | B60R 19/24 293/155 |
| 2025/0206249 | A1 * | 6/2025 | Murata | B62D 27/065 |

* cited by examiner

BREAKAWAY SUPPORTING MEMBER HAVING CONTROLLED BREAK POINTS

FIELD OF THE INVENTION

The present disclosure relates generally to breakaway supporting member, and more particularly to a breakaway supporting member having controlled break points between a breakaway portion and a fixed portion, thereby allowing high value components to be positioned on a side of the break points away from the breakaway portion.

BACKGROUND

Collisions or bad road conditions can cause damage to vehicle bumpers. For example, without limitation, low speed damageability events due to potholes and high curbs and/or road barriers, or collisions with poles, barriers, and trash cans can cause damage to a vehicle, often to the vehicle bumper around a corner of the vehicle. Such damage to the bumper can extend to surrounding or nearby expensive, delicate, or critical components installed in the vehicle, for example without limitation, the rest of the bumper not damaged, radar and/or lidar systems, fog lamps, vehicle grilles, sensors, and/or a camera. Any component that gets damaged needs to be replaced or repaired, and repairs of any damaged components can be costly for a consumer.

A need therefore exists for a system for supporting a vehicle bumper and/or portion of a vehicle, where the system manages impact energy upon collision by breaking away before damage reaches the expensive, delicate, or critical components. It would be beneficial if the system included a portion that can break away from the rest of the vehicle along a predetermined break line defined by predetermined break points. It would be beneficial if the break line could be arranged to have the expensive, delicate, or critical components, disposed on a fixed side of the break line and less critical components, for example, a part of the bumper, disposed on a breakaway side of the break line. Such an arrangement prevents damage to the nearby expensive, delicate, or critical components, resulting in a quicker and simpler repair associated with a lower repair cost and a lower cost of ownership. It would be further beneficial if such a system could be manufactured as a repair kit having a low cost and easy installation.

SUMMARY OF THE INVENTION

In one aspect of the invention, a breakaway supporting member having controlled break points, comprises one or more slotted members configured to attach to a vehicle chassis, and a structural support member configured to support one or more vehicle components. The structural support member comprises one or more discrete stress risers that extend from the structural support member. Each of the one or more discrete stress risers comprises a tab extending therefrom, wherein each of the tabs is configured to be inserted through a slot disposed through each of the one or more slotted members.

In another aspect of the invention, a breakaway supporting member having controlled break points, comprises a plurality of slotted members configured to attach to a vehicle chassis, and a structural support member configured to support one or more vehicle components. The structural support member comprises a plurality of discrete stress risers that extend from the structural support member. Each of the plurality of discrete stress risers comprises a pair of tabs extending therefrom, wherein each of the pair of tabs is configured to be inserted through a pair of slots disposed through each of the plurality of slotted members.

In a further aspect of the invention, a breakaway supporting member having controlled break points, comprises a plurality of slotted members, each slotted member having a pair of slots and a pair of mounting holes disposed therethrough, and a structural support member configured to support at least a portion of the bumper. The structural support member further comprises a plurality of discrete stress risers that extend from the structural support member, wherein each of the plurality of discrete stress risers comprises a pair of tabs extending therefrom. Each tab comprises a tab hole disposed therethrough to define a pair of tab holes for each pair of tabs, wherein the pair of tab holes aligns with the pair of mounting holes when each pair of tabs is inserted through the pair of slots. A plurality of fasteners each disposed through the tab hole and one of the pair of mounting holes attaches the plurality of slotted members to a vehicle chassis.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope.

Figure 1:
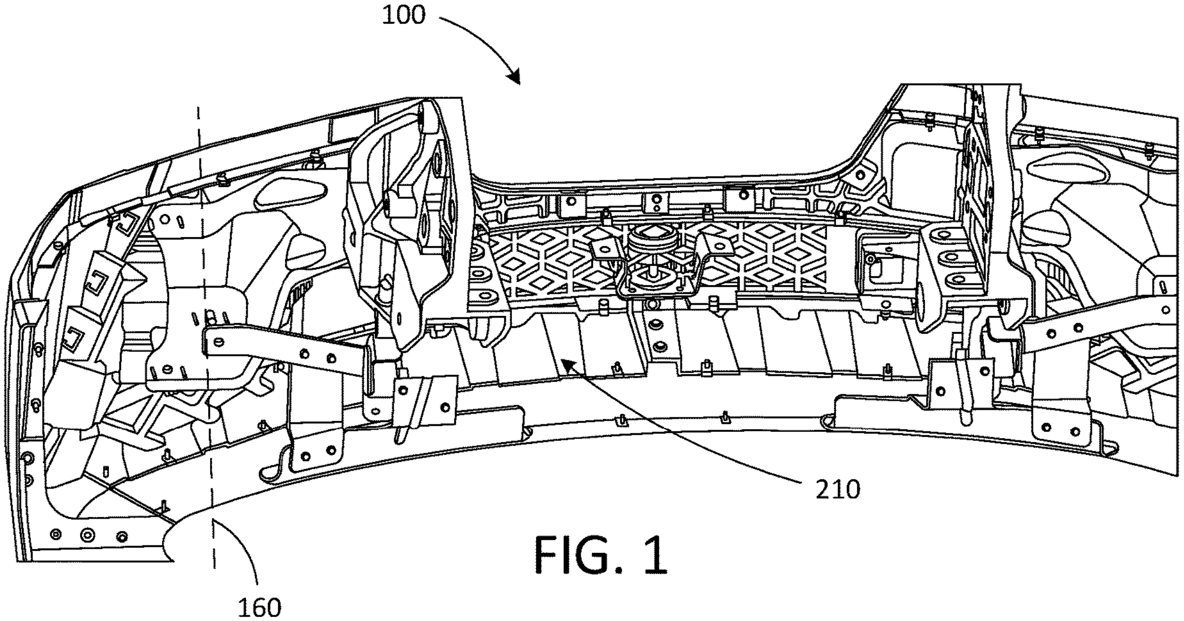
FIG. 1 is a three-dimensional schematic representation of an exemplary bumper support structure looking forwardly out from a vehicle interior according to an embodiment.

In the following detailed description, various embodiments are described with reference to the appended drawings. The skilled person will understand that the accompanying drawings are schematic and simplified for clarity. Like reference numerals refer to like elements or components throughout. Like elements or components will therefore not necessarily be described in detail with respect to each figure.

DETAILED DESCRIPTION

Figure 2:
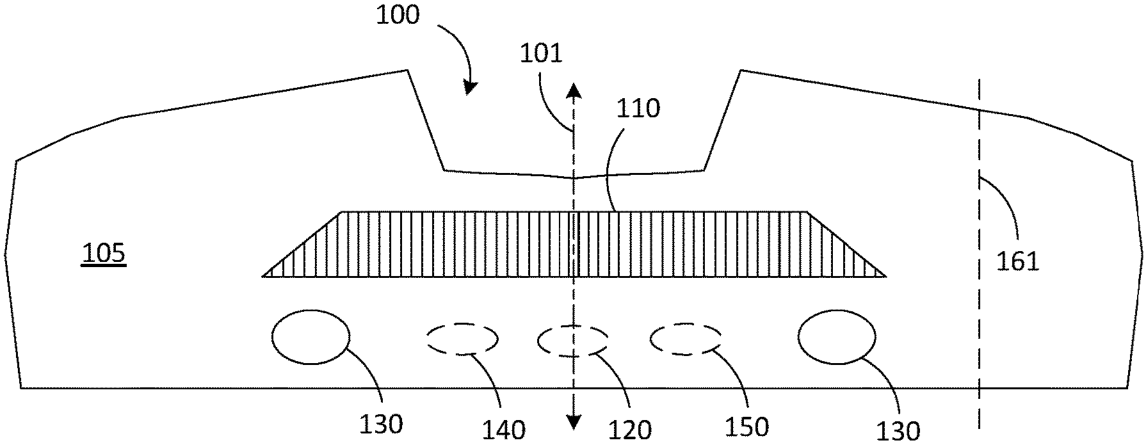
FIG. 2 is a schematic representation of a front elevational view of an exemplary bumper support structure including a lateral centerline according to an embodiment.
Figure 3:
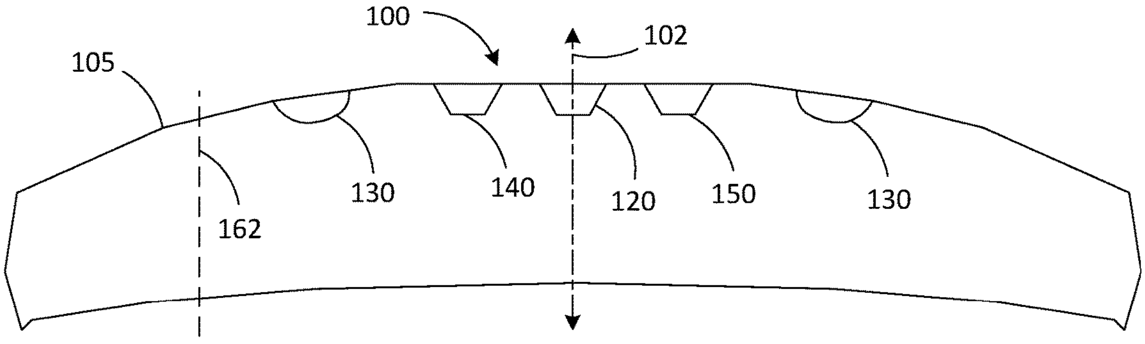
FIG. 3 is a schematic representation of a top plan view looking down on an exemplary bumper support structure including a longitudinal centerline according to an embodiment.

Referring to FIGS. 1-3, an exemplary bumper support structure 100 of a vehicle is schematically shown. FIG. 1 illustrates a three-dimensional schematic representation of the bumper support structure 100 looking forwardly out from the vehicle interior. FIG. 2 represents a schematic front elevational view of the bumper support structure 100 including a lateral centerline 101, and FIG. 3 represents a schematic top plan view looking down on the bumper support structure 100 including a longitudinal centerline 102. Referring to FIGS. 2 and 3, an exemplary bumper 105 is illustrated along with several exemplary expensive, delicate, or critical components, for example, a grille 110, a radar or lidar system 120, fog lamps 130, a sensor 140, and a camera 150. All descriptions herein of the bumper support structure 100 apply equally to either a front end bumper support structure 100 or a back end bumper support structure 100.

Referring to FIGS. 1-3, the dashed lines 160, 161, 162 respectively, are indicative of the approximate exemplary plane at which a conventional bumper support structure is theoretically vulnerable to damage, wherein for example, a corner of the bumper, either at the front or the rear of the vehicle, is likely to be shorn off through collision. In reality, a conventional bumper support structure most likely does not cleanly shear along any single plane, but rather breaks unevenly over a broader region, resulting in additional unwanted and expensive damage done to the exemplary expensive, delicate, or critical components described above that are shown disposed closer to the longitudinal and lateral centerlines 101, 102 in FIGS. 2 and 3, respectively.

Figure 4A:
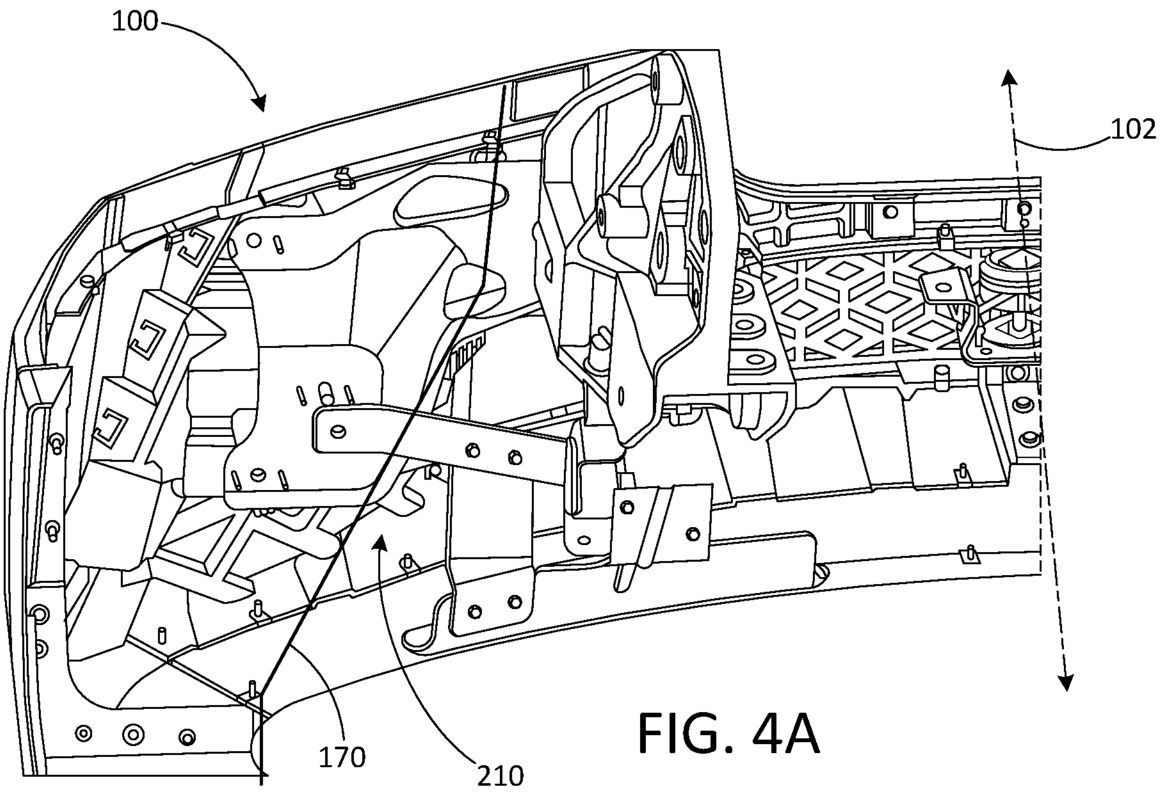
FIG. 4A is a three-dimensional schematic representation of an exemplary bumper support structure looking forwardly out from the vehicle interior and illustrating an exemplary embodiment of a breakaway line comprising straight line segments.
Figure 4B:
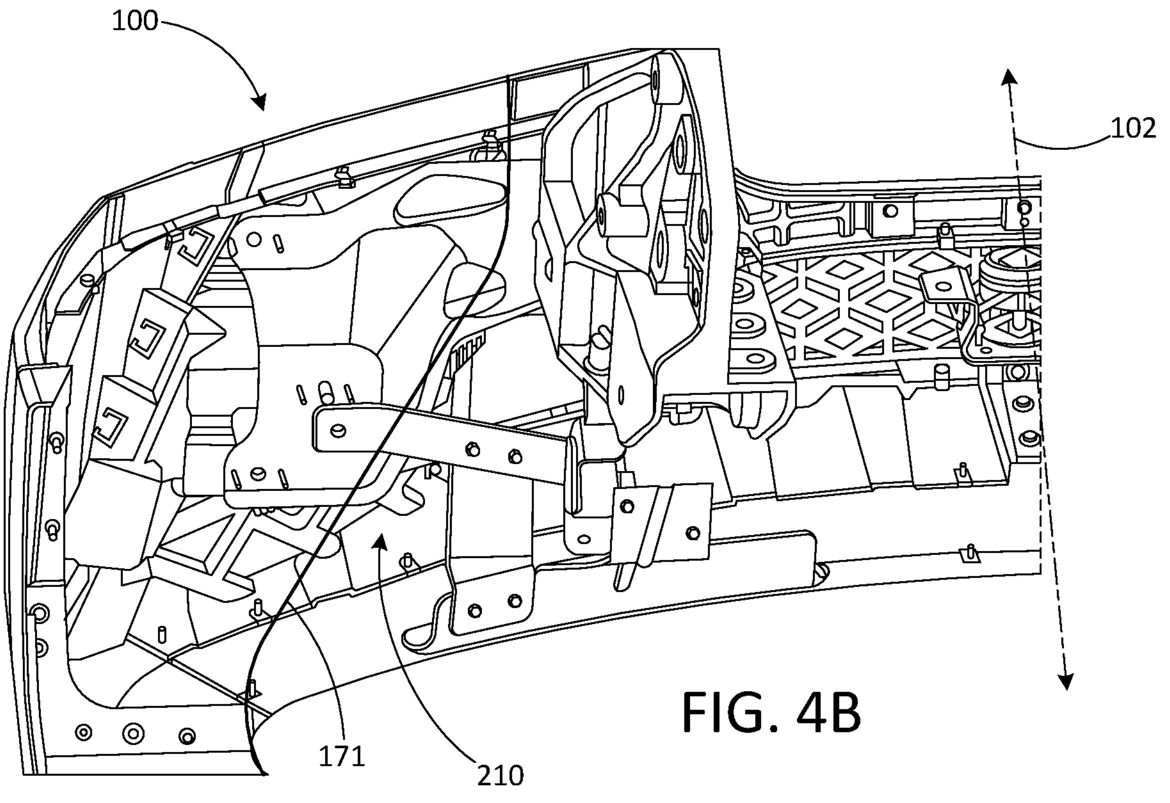
FIG. 4B is a three-dimensional schematic representation of an exemplary bumper support structure looking forwardly out from the vehicle interior and illustrating an exemplary embodiment of a breakaway line comprising a curvilinear line segment.

Referring to FIGS. 4A and 4B, enlarged three-dimensional schematic representations of the bumper support structure 100 looking forwardly out from the vehicle interior illustrate exemplary embodiments of breakaway lines 170, 171 through the bumper support structure 100. In an embodiment as shown in FIG. 4A, which is three-dimensional, the breakaway line 170 comprises straight line segments that may or may not lie within a single plane. In an embodiment as shown in FIG. 4B, which is three-dimensional, the breakaway line 171 illustrates a curvilinear line that may or may not lie within a single plane. Both of the breakaway lines 170 and 171 are illustrated as having at least a portion that is diagonal to the longitudinal centerline 102; however, in other embodiments the breakaway lines 170 and 171 can be entirely parallel to, entirely perpendicular to, or entirely diagonal to the longitudinal centerline 102. The breakaway lines 170 and 171 are described more fully hereinbelow in the context of aligned break points.

Figure 5A:
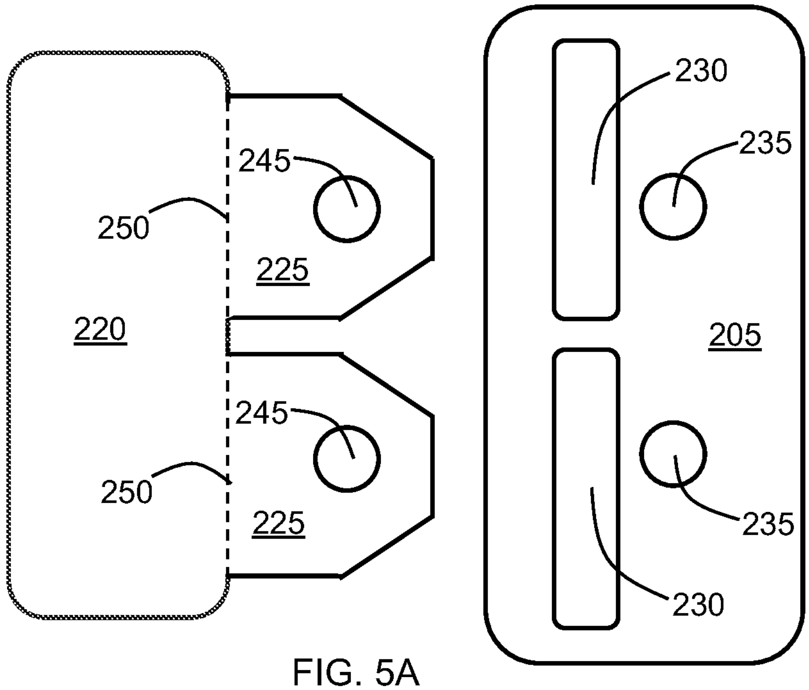
FIG. 5A is a schematic representation of a stress riser having tabs separated from a slotted member according to an embodiment.
Figure 5B:
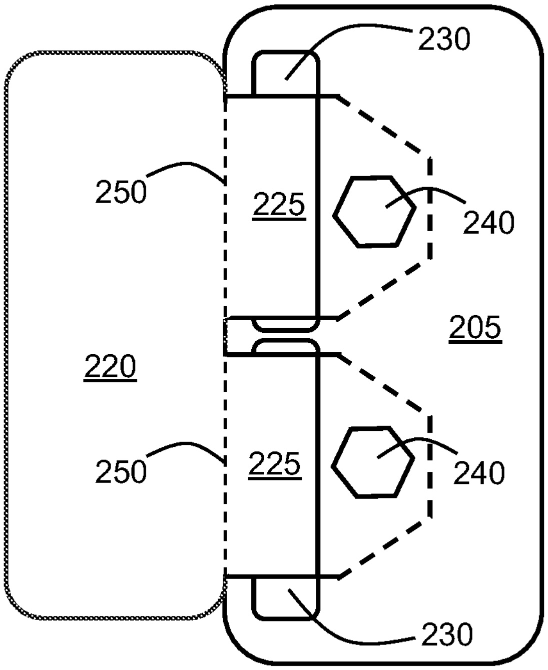
FIG. 5B is a schematic representation of a stress riser having tabs inserted into a slotted member according to an embodiment.
Figure 6:
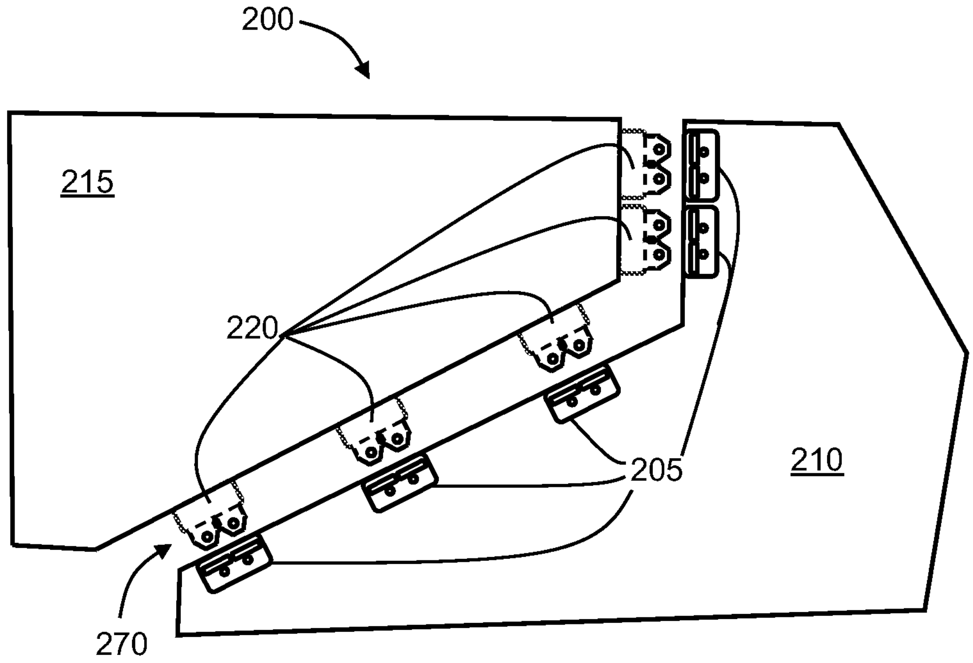
FIG. 6 is a schematic representation of an embodiment of the one or more discrete stress risers arranged in an exemplary predetermined alignment.

Referring to FIGS. 5A-6, in an embodiment a breakaway supporting member 200 comprises one or more slotted members 205 each having at least one slot 230 and configured to attach to a vehicle chassis 210. In other embodiments, the breakaway supporting member 200 comprises two, three, four, or more slotted members 205, or a plurality of slotted members 205 including as many slotted members 205 as are desired or needed to support a structural support member or plate 215 (see FIG. 6). In an embodiment the attachment points are portions of the bumper support structure 100; however, in other embodiments the attachment points for the one or more slotted members 205 are portions of the vehicle chassis that is outside of the bumper support structure 100. In an embodiment the slotted members 205 have a shape viewed in a top plan view as generally rectangular; however, in other embodiments the slotted members 205 can be any shape as desired or to fit along a supporting edge of the vehicle chassis 210 as needed.

Referring particularly to FIG. 6, in an embodiment the breakaway supporting member 200 further comprises a structural support member or plate 215 that is configured to support one or more vehicle components, for example without limitation, a headlight (not shown), or a portion of the bumper 105. The shapes of the vehicle chassis 210 and the structural support member or plate 215 shown in plan view in FIG. 6 are for exemplary schematic purposes only and can be any shape as needed or desired to fit within a vehicle and function as described herein. In an embodiment the structural support member or plate 215 comprises one or more discrete stress risers 220 that each extend from the structural support member or plate 215. In other embodiments, the structural support member or plate 215 comprises two, three, four, or more discrete stress risers 220, or a plurality of discrete stress risers 220 including as many discrete stress risers 220 as are desired or needed to support the structural support member or plate 215 (see FIG. 6). In an embodiment the one or more discrete stress risers 220 are integral with the structural support member or plate 215. However, in other embodiments the one or more stress risers 220 can attach to the structural support member via a fastener or weld point.

Referring again to FIGS. 5A-6, in an embodiment each of the one or more discrete stress risers 220 comprises at least one tab 225 extending therefrom. In an embodiment each of the tabs 225 is configured to be inserted through a slot 230 disposed through each of the one or more slotted members 205. In an embodiment each of the one or more slotted members 205 further comprises one or more mounting holes 235 disposed therethrough, wherein the one or more slotted members 205 attach to the vehicle chassis 210 via a fastener 240, for example without limitation, a bolt 240 disposed through each of the one or more mounting holes 235. As illustrated in FIGS. 5A and 5B, in an embodiment each of the tabs 225 comprises a tab hole 245 disposed therethrough, wherein each tab hole 245 aligns with one of the one or more mounting holes 235 when each tab 225 is inserted through the slot 230 so that the fastener 240 is disposed through the tab hole 245 and the one of the one or more mounting holes 235.

In other embodiments the one or more slotted members 205 can attach to the chassis 210 via direct welding or can be integral with the chassis 210. In other embodiments the one or more slotted members 205 can lack slots or have other features that allow the one or more stress risers 220 to interlock therewith. In an embodiment each of the one or more discrete stress risers 220 comprises a pair of tabs 225, wherein each of the one or more slotted members 205 comprises a pair of slots 230 disposed therethrough, and wherein the pair of tabs 225 is configured to be inserted through the pair of slots 230 (see FIG. 6). In an embodiment each tab 225 comprises a tab hole 245 disposed therethrough to define a pair of tab holes 245 for each pair of tabs 225, wherein each of the one or more slotted members 205 further comprises a pair of mounting holes 235 disposed therethrough, and wherein the pair of tab holes 245 aligns with the pair of mounting holes 235 when each pair of tabs 225 is inserted through the pair of slots 230, so that the fastener 240 is disposed through the tab hole 245 and one of the pair of mounting holes 235 (sec FIG. 6).

In an embodiment, each of the tabs 225 is configured to break away from the stress riser 220 from which it extends when subjected to a predetermined stress level. In an embodiment the predetermined stress level is defined by a predetermined level of shear stress acting along or across an interface 250 between the tab 225 and the stress riser 220. In an embodiment the predetermined stress level is defined by a predetermined level of normal stress acting perpendicular to the interface 250 between the tab 225 and the stress riser 220. In another embodiment the predetermined level of stress is defined by a stress tensor acting at the interface 250.

Referring now to FIGS. 4A, 4B, and 6, in an embodiment the one or more discrete stress risers 220 are arranged in a predetermined alignment 270 relative to the vehicle, for example without limitation, the predetermined alignment 270 follows one of the alignments illustrated by the breakaway lines 170 and 171 in FIGS. 4A and 4B, respectively. In an embodiment the structural support member or plate 215 breaks away from the one or more slotted members 205 along the predetermined alignment 270 when subjected to an external force that results in each of the tabs 225 being subjected to the predetermined stress level. Regardless of the embodiment described herein, the predetermined stress level at which the tab 225 breaks away from the stress riser 220 is always less than the stress that would be required to break the riser 220 off of the structural support member or plate 215 or to separate the one or more slotted members 205 from the vehicle chassis 210. This requirement assures that the breakaway line 170, 171 will always follow the predetermined alignment 270 as described above.

In any of the embodiments disclosed hereinabove, the tabs 225 held within the slots 230 and arranged in a predetermined alignment 270 allows for the structural support member or plate 215 to break away at the tabs 225, thereby providing a controlled detachment and while preventing collision energy from spreading to the expensive, delicate, or critical components that are mounted on the opposite side of the predetermined alignment 270. The controlled detachment as provided herein facilitates a simple and economical way to repair the damage. For example, in an embodiment, a repair kit could comprise an intact structural support member or plate 215 and the fasteners 240 as needed to replace the damaged structural support member or plate 215. In another embodiment, the same kit or a separate kit includes a set of one or more slotted members 205 and the fasteners 240 as needed to replace any slotted members 205 or fasteners 240 that were damaged during the separation of the tabs 225 from the structural support member or plate 215.

In an embodiment any of the components described hereinabove, for example, the structural support member or plate 215 including the stress risers 220 and the tabs 225, the one or more slotted members 205, and the fasteners 240 can be made from metals, plastics, and/or composite materials, for example without limitation, including thermoplastic polyolefin (TPO), polypropylene (PP), talc, glass, carbon-filled PP resins, polycarbonate (PC), acrylonitrile butadiene styrene (ABS), PC+ABS, acrylic-styrene-acrylonitrile terpolymer (ASA), and combinations thereof.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity. Unless otherwise noted, the use of the words "approximate," "about," "around," "substantially," etc., mean plus or minus ten percent.

INDUSTRIAL APPLICABILITY

A breakaway supporting member having controlled break points is presented, which allows a vehicle to sustain damage from a collision or road hazard while minimizing the spread of damage from the collision. In response to the energy of collision the breakaway supporting member breaks away from the vehicle chassis along a breakaway line thereby inhibiting damage to the expensive, delicate, or critical components that are mounted on the opposite side of the breakaway line. A repair kit is also provided for simple and economical repair of the damage. The breakaway supporting member having controlled break points can be manufactured in industry for use on vehicles purchased by consumers.

Numerous modifications to the present invention will be apparent to those skilled in the art in view of the foregoing description. It is not desired to limit the invention to the exact construction and operation shown and described, and accordingly, all suitable modifications and equivalents may be resorted to, falling within the scope of the invention. Accordingly, this description is to be construed as illustrative only of the principles of the invention and is presented for the purpose of enabling those skilled in the art to make and use the invention and to teach the best mode of carrying out same. The exclusive rights to all modifications which come within the scope of the appended claims are reserved. All patents, patent publications and applications, and other references cited herein are incorporated by reference herein in their entirety.

We claim:

1. A breakaway supporting member having controlled break points, comprising:

one or more slotted members configured to attach to a vehicle chassis; wherein each of the one or more slotted members further comprises one or more mounting holes disposed therethrough, and wherein the one or more slotted members attach to the vehicle chassis via a fastener disposed through each of the one or more mounting holes; and a structural support member configured to support one or more vehicle components, the structural support member comprising one or more discrete stress risers that extend from the structural support member;

wherein each of the one or more discrete stress risers comprises a tab extending therefrom; wherein each of the tabs comprises a tab hole disposed therethrough, wherein each tab hole aligns with one of the one or more mounting holes when each tab is inserted through a slot disposed through each of the one or more slotted members so that the fastener is disposed through the tab hole and the one of the one or more mounting holes.

2. The breakaway supporting member of claim 1, wherein each of the one or more discrete stress risers comprises a pair of tabs, wherein each of the one or more slotted members comprises a pair of slots disposed therethrough, and wherein the pair of tabs is configured to be inserted through the pair of slots.

3. The breakaway supporting member of claim 2, wherein each tab comprises a tab hole disposed therethrough to define a pair of tab holes for each pair of tabs, wherein each of the one or more slotted members further comprises a pair of mounting holes disposed therethrough, and wherein the pair of tab holes aligns with the pair of mounting holes when each pair of tabs is inserted through the pair of slots, so that the fastener is disposed through the tab hole and one of the pair of mounting holes.

4. The breakaway supporting member of claim 3, wherein each of the tabs is configured to break away from the stress riser from which it extends when subjected to a predetermined stress level.

5. The breakaway supporting member of claim 4, wherein the one or more discrete stress risers are arranged in a predetermined alignment relative to the vehicle, whereby the structural support member breaks away from the one or more slotted members along the predetermined alignment when subjected to an external force that results in each of the tabs being subjected to the predetermined stress level.

6. The breakaway supporting member of claim 5, wherein the structural support member supports at least a portion of a bumper.

7. A breakaway supporting member having controlled break points, comprising:

a plurality of slotted members configured to attach to a vehicle chassis; wherein each of the plurality of slotted members further comprises a pair of mounting holes disposed therethrough, and wherein the plurality of slotted members attaches to the vehicle chassis via a fastener disposed through each of the mounting holes; and a structural support member configured to support one or more vehicle components, the structural support member comprising a plurality of discrete stress risers that extend from the structural support member;

wherein each of the plurality of discrete stress risers comprises a pair of tabs extending therefrom; wherein each tab comprises a tab hole disposed therethrough to define a pair of tab holes for each pair of tabs, wherein each of the plurality of slotted members further comprises a pair of mounting holes disposed therethrough, and wherein the pair of tab holes aligns with the pair of mounting holes when each pair of tabs is inserted through the pair of slots, so that the fastener is disposed through the tab hole and one of the pair of mounting holes.

8. The breakaway supporting member of claim 7, wherein each of the tabs is configured to break away from the stress riser from which it extends when subjected to a predetermined stress level.

9. The breakaway supporting member of claim 8, wherein the plurality of discrete stress risers is arranged in a predetermined alignment relative to the vehicle, whereby the structural support member breaks away from the plurality of slotted members along the predetermined alignment when subjected to an external force that results in each of the tabs being subjected to the predetermined stress level.

10. The breakaway supporting member of claim 9, wherein the structural support member supports at least a portion of a bumper.

11. A breakaway supporting member having controlled break points, comprising:

a plurality of slotted members, each slotted member having a pair of slots and a pair of mounting holes disposed therethrough; and a structural support member configured to support at least a portion of a bumper, the structural support member further comprising a plurality of discrete stress risers that extend from the structural support member;

wherein each of the plurality of discrete stress risers comprises a pair of tabs extending therefrom, wherein each tab comprises a tab hole disposed therethrough to define a pair of tab holes for each pair of tabs; and wherein the pair of tab holes aligns with the pair of mounting holes when each pair of tabs is inserted through the pair of slots, and a plurality of fasteners each disposed through the tab hole and one of the pair of mounting holes attaches the plurality of slotted members to a vehicle chassis.

12. The breakaway supporting member of claim 11, wherein each of the tabs is configured to break away from the stress riser from which it extends when subjected to a predetermined stress level.

13. The breakaway supporting member of claim 12, wherein the plurality of discrete stress risers is arranged in a predetermined alignment relative to the vehicle, whereby the structural support member breaks away from the plurality of slotted members along the predetermined alignment when subjected to an external force that results in each of the tabs being subjected to the predetermined stress level.

14. The breakaway supporting member of claim 13, wherein the predetermined alignment lies within a plane.

15. The breakaway supporting member of claim 13, wherein the predetermined alignment comprises one or more line segments.

16. The breakaway supporting member of claim 13, wherein the predetermined alignment comprises a curvilinear pattern of alignment.

* * * * *